(12) United States Patent
Young et al.

(10) Patent No.: US 10,439,505 B2
(45) Date of Patent: Oct. 8, 2019

(54) POWER MODULE

(71) Applicant: GM GLOBAL TECHNOLOGY OPERATIONS LLC, Detroit, MI (US)

(72) Inventors: Ronald W. Young, Clarkston, MI (US); Terence G. Ward, Waterford, MI (US); Marko Jaksic, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/661,689

(22) Filed: Jul. 27, 2017

(65) Prior Publication Data

US 2019/0031034 A1    Jan. 31, 2019

(51) Int. Cl.
| | |
|---|---|
| *B60L 11/18* | (2006.01) |
| *H02P 27/06* | (2006.01) |
| *H02M 7/00* | (2006.01) |
| *B60L 50/51* | (2019.01) |
| *H02M 7/539* | (2006.01) |
| *H02M 7/5387* | (2007.01) |
| *H02P 101/45* | (2016.01) |

(52) U.S. Cl.
CPC .............. *H02M 7/003* (2013.01); *B60L 50/51* (2019.02); *H02M 7/539* (2013.01); *H02M 7/53875* (2013.01); *H02P 27/06* (2013.01); *B60L 2210/40* (2013.01); *H02P 2101/45* (2015.01)

(58) Field of Classification Search
CPC ......... B26B 19/00; B26B 19/06; B26B 19/38; B26B 19/388; A61B 17/1626
USPC .......................................................... 318/504
See application file for complete search history.

(56) References Cited

U.S. PATENT DOCUMENTS

| | | | |
|---|---|---|---|
| 2004/0008993 A1 | 1/2004 | Tai | |
| 2004/0089934 A1 | 5/2004 | Shimoida et al. | |
| 2007/0109715 A1* | 5/2007 | Azuma | B60L 50/16 361/299.3 |
| 2010/0302737 A1* | 12/2010 | Yankoski | H01L 25/18 361/709 |
| 2018/0022220 A1* | 1/2018 | Xu | H02M 7/003 307/10.1 |

FOREIGN PATENT DOCUMENTS

DE    102010027967 A1    3/2015

* cited by examiner

*Primary Examiner* — Kawing Chan
*Assistant Examiner* — Bradley R Brown
(74) *Attorney, Agent, or Firm* — Lorenz & Kopf, LLP

(57) ABSTRACT

A power module includes a first circuit structure having a first bus substrate. The first bus structure has a first side on which is disposed a first circuit element. A second circuit structure has a second bus substrate and a second side on which is disposed a second circuit element. The first circuit structure and the second circuit structure are oriented in a stacked configuration such that the first side is disposed facing the second side, and the first circuit element partially overlaps the second circuit element. An output bus is disposed between the first circuit structure and the second circuit structure.

17 Claims, 3 Drawing Sheets

POWER MODULE

TECHNICAL FIELD

This patent relates to power semiconductor switches, and in particular, to a power module using power semiconductor switches.

BACKGROUND

Electronic power modules are used extensively for modifying readily available sources of electric power to suit specific applications. These modules are used in the manufacturing industry, in conventional and renewable power generation and transmission, and in automotive applications. Such modules may provide a direct current (DC) to DC function, a DC to alternating current (AC) function or an AC to AC function. These modules use solid-state devices, such as power semiconductor switches, typically insulated gate bipolar junction transistors (IGBTs), metal oxide semiconductor field effect transistors (MOSFETs), gate-turnoff thyristors (GTOs), and the like to achieve the required switching process. While the switches enable the transfer of great amounts of power, their control, essentially the turn on and turn off functions, is accomplished using very little energy through a gate terminal.

Electric motor drive systems as generally employed in electric vehicle applications typically include an AC electric motor, a power module and a DC power source, such as a storage battery. The power module typically converts the DC electric power from the power source to AC electric power to drive the electric motor and AC electric power from a power source to DC electric power for recharging the storage battery. The module may include IGBT or similar power semiconductor based switches that switch in a complementary manner to convert DC power to AC power and AC power to DC power, as the case may be. The AC power drives the AC electric motor, which in turn drives one or more wheels of the vehicle thereby providing propulsion, while the DC power is coupled to the storage battery system to replenish its charge.

The power semiconductor switches within the module operate at high switching speeds. At these switching speeds, the module is sensitive to electronic noise, and in particular noise resulting from induced or parasitic inductance. Operation at high switching speeds in combination with the power levels being processed furthermore generates significant heat often requiring cooling of the module to protect the components and to provide efficient operation.

Therefore, it is desirable to provide a package for the electronic components, and in particular the power semiconductor switches, of a module that reduces sensitivity to electronic noise and provides thermal management.

SUMMARY

In one embodiment, an electric vehicle has a direct current (DC) power source with a DC electric power output. A compact module is coupled to receive the DC electric power output of the DC power source and to provide an alternating current (AC) electric power output. An electric motor is coupled to receive the AC electric power output. The electric motor has a driving torque output that is coupled to drive at least one wheel of the vehicle. The module includes a power module that has a first circuit structure and a second circuit structure. The first circuit structure and the second circuit structure are stacked relative to an output structure, and a first circuit element of the first circuit structure at least partially overlaps a second circuit element of the second circuit structure.

In one embodiment, an electric vehicle has a direct current (DC) power source with a DC electric power output. A compact module is coupled to receive the DC electric power output of the DC power source and to provide an alternating current (AC) electric power output. An electric motor is coupled to receive the AC electric power output. The electric motor has a driving torque output that is coupled to drive at least one wheel of the vehicle. The module includes a power module that has a first circuit structure and a second circuit structure. The first circuit structure and the second circuit structure are stacked relative to an output structure, and a first circuit element of the first circuit structure at least partially overlaps a second circuit element of the second circuit structure. Each of the first circuit element and the second circuit element is one of an insulated-gate bipolar transistor (IGBT), a metal oxide field effect transistor (MOSFET) and a gate turn off thyristor (GTO).

In one embodiment, an electric vehicle has a direct current (DC) power source with a DC electric power output. A compact module is coupled to receive the DC electric power output of the DC power source and to provide an alternating current (AC) electric power output. An electric motor is coupled to receive the AC electric power output. The electric motor has a driving torque output that is coupled to drive at least one wheel of the vehicle. The module includes a power module that has a first circuit structure and a second circuit structure. The first circuit structure and the second circuit structure are stacked relative to an output structure, and a first circuit element of the first circuit structure at least partially overlaps a second circuit element of the second circuit structure. The first circuit structure is a first DC bus member and the second circuit structure is a second DC bus member.

In one embodiment, an electric vehicle has a direct current (DC) power source with a DC electric power output. A compact module is coupled to receive the DC electric power output of the DC power source and to provide an alternating current (AC) electric power output. An electric motor is coupled to receive the AC electric power output. The electric motor has a driving torque output that is coupled to drive at least one wheel of the vehicle. The module includes a power module that has a first circuit structure and a second circuit structure. The first circuit structure and the second circuit structure are stacked relative to an output structure, and a first circuit element of the first circuit structure at least partially overlaps a second circuit element of the second circuit structure. The first circuit structure is a first DC bus member and the second circuit structure is a second DC bus member, and each of the first DC bus member and the second DC bus member is a copper substrate.

In one embodiment, an electric vehicle has a direct current (DC) power source with a DC electric power output. A compact module is coupled to receive the DC electric power output of the DC power source and to provide an alternating current (AC) electric power output. An electric motor is coupled to receive the AC electric power output. The electric motor has a driving torque output that is coupled to drive at least one wheel of the vehicle. The module includes a power module that has a first circuit structure and a second circuit structure. The first circuit structure and the second circuit structure are stacked relative to an output structure, and a first circuit element of the first circuit structure at least partially overlaps a second circuit element of the second circuit structure. The first circuit structure is a first DC bus member and the second circuit structure is a second DC bus member, and the first circuit element is formed on the first DC bus member and the second circuit element is formed on the second circuit member.

In one embodiment, an electric vehicle has a direct current (DC) power source with a DC electric power output. A compact module is coupled to receive the DC electric power output of the DC power source and to provide an alternating current (AC) electric power output. An electric motor is coupled to receive the AC electric power output. The electric motor has a driving torque output that is coupled to drive at least one wheel of the vehicle. The module includes a power module that has a first circuit structure and a second circuit structure. The first circuit structure and the second circuit structure are stacked relative to an output structure, and a first circuit element of the first circuit structure at least partially overlaps a second circuit element of the second circuit structure. A first thermal conductor is disposed between the first circuit element and the output member, and a second thermal conductor is disposed between the second circuit element and the output member.

In one embodiment, an electric vehicle has a direct current (DC) power source with a DC electric power output. A compact module is coupled to receive the DC electric power output of the DC power source and to provide an alternating current (AC) electric power output. An electric motor is coupled to receive the AC electric power output. The electric motor has a driving torque output that is coupled to drive at least one wheel of the vehicle. The module includes a power module that has a first circuit structure and a second circuit structure. The first circuit structure and the second circuit structure are stacked relative to an output structure, and a first circuit element of the first circuit structure at least partially overlaps a second circuit element of the second circuit structure. The output structure is an alternative current (AC) bus disposed between the first circuit structure and the second circuit structure with the first circuit element and the second circuit element each being operably coupled to the AC bus.

In one embodiment, an electric vehicle has a direct current (DC) power source with a DC electric power output. A compact module is coupled to receive the DC electric power output of the DC power source and to provide an alternating current (AC) electric power output. An electric motor is coupled to receive the AC electric power output. The electric motor has a driving torque output that is coupled to drive at least one wheel of the vehicle. The module includes a power module that has a first circuit structure and a second circuit structure. The first circuit structure and the second circuit structure are stacked relative to an output structure, and a first circuit element of the first circuit structure at least partially overlaps a second circuit element of the second circuit structure. The output structure is a three-phase alternative current (AC) bus disposed between the first circuit structure and the second circuit structure with the first circuit element and the second circuit element each being operably coupled to the AC bus.

In one embodiment, a power module has a first circuit structure and a second circuit structure. The first circuit structure and the second circuit structure are stacked relative to an output structure. A first circuit element of the first circuit structure at least partially overlaps a second circuit element of the second circuit structure.

In one embodiment, a power module has a first circuit structure and a second circuit structure. The first circuit structure and the second circuit structure are stacked relative to an output structure. A first circuit element of the first circuit structure at least partially overlaps a second circuit element of the second circuit structure. Each of the first circuit element and the second circuit element is one of an insulated-gate bipolar transistor (IGBT), a metal oxide field effect transistor (MOSFET) and a gate turn off thyristor (GTO).

In one embodiment, a power module has a first circuit structure and a second circuit structure. The first circuit structure and the second circuit structure are stacked relative to an output structure. A first circuit element of the first circuit structure at least partially overlaps a second circuit element of the second circuit structure. The first circuit structure is a first DC bus member and the second circuit structure is a second DC bus member.

In one embodiment, a power module has a first circuit structure and a second circuit structure. The first circuit structure and the second circuit structure are stacked relative to an output structure. A first circuit element of the first circuit structure at least partially overlaps a second circuit element of the second circuit structure. The first circuit structure is a first DC bus member and the second circuit structure is a second DC bus member, and each of the first DC bus member and the second DC bus member is a copper substrate.

In one embodiment, a power module has a first circuit structure and a second circuit structure. The first circuit structure and the second circuit structure are stacked relative to an output structure. A first circuit element of the first circuit structure at least partially overlaps a second circuit element of the second circuit structure. The first circuit structure is a first DC bus member and the second circuit structure is a second DC bus member. The first circuit element is formed on the first DC bus member and the second circuit element is formed on the second circuit member.

In one embodiment, a power module has a first circuit structure and a second circuit structure. The first circuit structure and the second circuit structure are stacked relative to an output structure. A first circuit element of the first circuit structure at least partially overlaps a second circuit element of the second circuit structure. A first thermal conductor is disposed between the first circuit element and the output member, and a second thermal conductor is disposed between the second circuit element and the output member.

In one embodiment, a power module has a first circuit structure and a second circuit structure. The first circuit structure and the second circuit structure are stacked relative to an output structure. A first circuit element of the first circuit structure at least partially overlaps a second circuit element of the second circuit structure. The output structure is an alternative current (AC) bus disposed between the first circuit structure and the second circuit structure, the first circuit element and the second circuit element each being operably coupled to the AC output structure.

In one embodiment, a power module has a first circuit structure and a second circuit structure. The first circuit structure and the second circuit structure are stacked relative to an output structure. A first circuit element of the first circuit structure at least partially overlaps a second circuit element of the second circuit structure. The output structure is a three-phase alternative current (AC) bus disposed between the first circuit structure and the second circuit structure, the first circuit element and the second circuit element each being operably coupled to the AC output structure.

In one embodiment, a power module has a first circuit structure having a first bus substrate. The first bus structure has a first side on which is disposed a first circuit element. A second circuit structure has a second bus substrate. The second bus structure has a second side on which is disposed a second circuit element. The first circuit structure and the second circuit structure are oriented in a stacked configuration, wherein the first side is disposed facing the second side. Also, the first circuit element partially overlaps the second circuit element. An output bus is disposed between the first circuit structure and the second circuit structure.

In one embodiment, a power module has a first circuit structure having a first bus substrate. The first bus structure has a first side on which is disposed a first circuit element. A second circuit structure has a second bus substrate. The second bus structure has a second side on which is disposed a second circuit element. The first circuit structure and the second circuit structure are oriented in a stacked configuration, wherein the first side is disposed facing the second side. Also, the first circuit element partially overlaps the second circuit element. An output bus is disposed between the first circuit structure and the second circuit structure. Each of the first circuit element and the second circuit element includes one of an insulated-gate bipolar transistor (IGBT), a metal oxide field effect transistor (MOSFET) and a gate turn off thyristor (GTO).

In one embodiment, a power module has a first circuit structure having a first bus substrate. The first bus structure has a first side on which is disposed a first circuit element. A second circuit structure has a second bus substrate. The second bus structure has a second side on which is disposed a second circuit element. The first circuit structure and the second circuit structure are oriented in a stacked configuration, wherein the first side is disposed facing the second side. Also, the first circuit element partially overlaps the second circuit element. An output bus is disposed between the first circuit structure and the second circuit structure. A first thermal conductor is disposed between the first circuit element and the output bus, and a second thermal conductor is disposed between the second circuit element and the output bus.

In one embodiment, a power module has a first circuit structure having a first bus substrate. The first bus structure has a first side on which is disposed a first circuit element. A second circuit structure has a second bus substrate. The second bus structure has a second side on which is disposed a second circuit element. The first circuit structure and the second circuit structure are oriented in a stacked configuration, wherein the first side is disposed facing the second side. Also, the first circuit element partially overlaps the second circuit element. An output bus is disposed between the first circuit structure and the second circuit structure. The output bus is an alternative current (AC) output bus.

DETAILED DESCRIPTION

Figure 1:
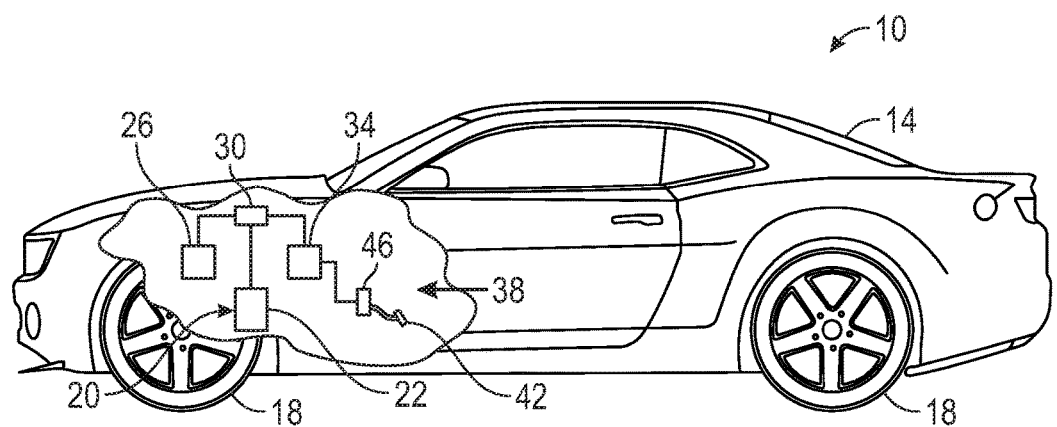
FIG. 1 is a graphic depiction of a vehicle including an electric drive system and control in accordance with the herein described exemplary embodiments.

The following detailed description is merely exemplary in nature and is not intended to limit the application and uses. Furthermore, there is no intention to be bound by any expressed or implied theory presented in the preceding technical field, background, summary or the following detailed description. It should be understood that throughout the drawings, corresponding reference numerals indicate like or corresponding parts and features. As used herein, the term system or module may refer to any combination or collection of mechanical and electrical hardware, software, firmware, electronic control component, processing logic, and/or processor device, individually or in any combination, including without limitation: application specific integrated circuit (ASIC), an electronic circuit, a processor (shared, dedicated, or group) that executes one or more software or firmware programs, memory to contain software or firmware instructions, a combinational logic circuit, and/or other suitable components that provide the described functionality.

Exemplary embodiments may be described herein in terms of functional and/or logical block components and various processing steps. It should be appreciated that such block components may be realized by any number, combination or collection of mechanical and electrical hardware, software, and/or firmware components configured to perform the specified functions. For example, an embodiment of the invention may employ various combinations of mechanical components and electrical components, integrated circuit components, memory elements, digital signal processing elements, logic elements, look-up tables, or the like, which may carry out a variety of functions under the control of one or more microprocessors or other control devices. In addition, those skilled in the art will appreciate that the exemplary embodiments may be practiced in conjunction with any number of mechanical and/or electronic systems, and that the vehicle systems described herein are merely exemplary embodiment of possible implementations.

For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Referring to FIG. 1, a vehicle 10 includes a vehicle body 14. The vehicle 10 also includes a plurality of wheels 18 that rotatably support the body 14 above the ground, i.e., the surface on which the vehicle is resting or traveling. The vehicle 10 also includes a powertrain 20, including an electric motor 22. The electric motor 22 is operatively connected to at least one of the wheels 18 to transmit torque thereto and thereby propel the vehicle 10. The motor 22 may be connected to the wheel 18 directly or indirectly, such as via a multi-speed transmission. The powertrain 20 also includes an electrical power source, such as a battery 26, which supplies electrical energy for the motor 22.

In the depicted embodiment, the powertrain 20 is a battery-electric powertrain, i.e., the battery 26 is the only source of energy for powering the motor 22. However, other powertrain configurations having an electric motor may be employed within the scope of the herein described embodiments. For example, the powertrain may also be a hybrid-electric powertrain in which an engine also provides power to propel the vehicle, in series or in parallel with the motor 22, or to drive a generator source to produce AC or DC electric power that may be coupled to the motor 22 and/or the battery 26.

The motor 22 may be a permanent magnet motor that uses AC electric power. The battery 26 provides DC electric power. The powertrain 20 includes a compact power module, or as referred to herein, module 30 that is operatively connected to the battery 26 such that the module 30 receives the DC electric power from the battery 26 and converts it to AC electric power. The module 30 is operatively connected to the motor 22 to transmit the AC electric power thereto. The module 30 furthermore may be coupled to receive AC electric power from a conductively or inductively coupled external source or an onboard source (not depicted) and to convert the AC electric power to DC electric power for charging the battery 26.

The powertrain 20 also includes a controller 34 that is operatively connected to the module 30 and motor 22 such that the controller 34 controls the module 30 and the motor 22. The controller 34 may be a general-purpose digital computer, generally including a microprocessor or central processing unit, one or more forms of memory, clock and synchronization circuitry, analog to digital (A/D) and digital to analog (D/A) circuitry, input/output circuitry and devices (I/O) and appropriate signal conditioning and buffer circuitry. The controller 34 may have a set of control algorithms, including resident program instructions and calibrations stored in the memory and executed to provide the respective functions of the controller 34. As used herein, a "controller" may include one or more controllers, microprocessors, central processing units, or other devices that cooperate to perform the operations described herein.

The vehicle 10 also includes an input device 38 that is operable by a driver of the vehicle 10 to input a desired or requested torque output of the motor 22. In the embodiment depicted, the input device 38 includes a foot pedal 42 that is selectively depressible. The input device 38 also includes a sensor 46 that determines the position of the pedal 42 and transmits a signal indicative of the position of the pedal 42 to the controller 34. Typically, a larger displacement of the pedal from a default position is indicative of a higher requested torque. When the pedal 42 is not depressed, then the requested torque is zero. The controller 34 controls the torque output of the motor 22 by regulating the amount of energy transmitted to the motor 22 from the battery 26 via the module 30 in response to the position of the pedal 42. The input device 38 may alternatively be an output of an autonomous vehicle operation controller (not depicted).

Figure 2:
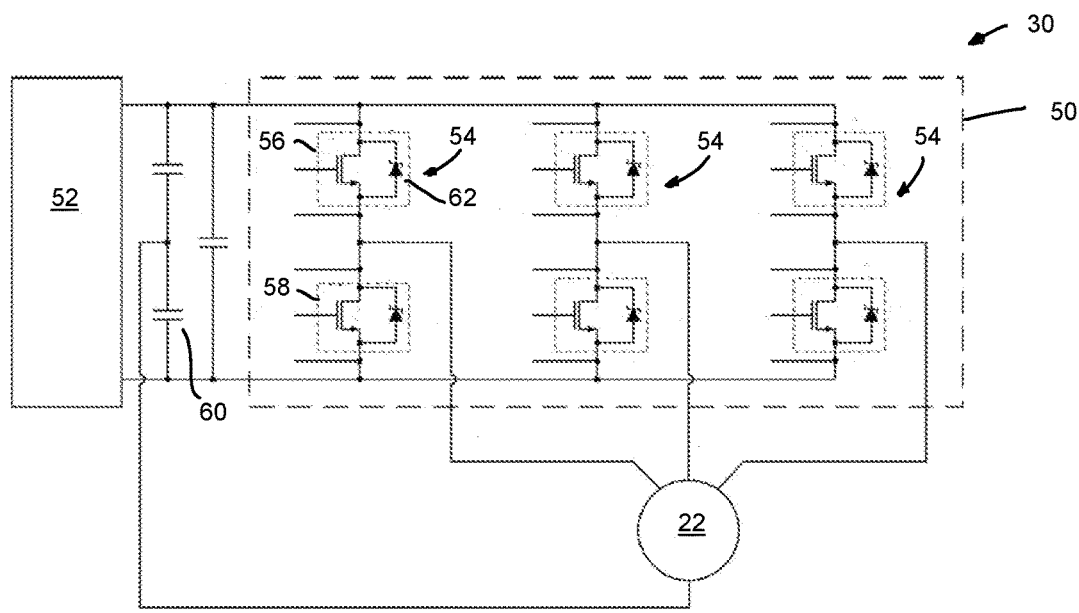
FIG. 2 is a schematic circuit diagram of a compact power module in accordance with herein described exemplary embodiments.

With reference to FIG. 2, the module 30 includes a power module 50 that provides from a DC electric power source 52, such as a battery, large capacitor or other suitable electric energy storage system (ESS), three-phase AC electric power to the electric motor 22. The module 50 includes three (3) switch sets 54, each switch set 54 corresponding to an AC electric power phase and each furthermore including a first insulated-gate bipolar transistor (IGBT) 56 and a second IGBT 58 coupled to control a current flow to provide the three-phase AC electric power to the motor 22. The operation of the module 50 to provide AC electric power to the motor 22 is controlled by a suitable controller (not depicted), and the module 50 operates in response to one or more control signals from the controller. The power module 50 may additionally include circuit components such as capacitors 60 (one depicted) and diodes 62 (one depicted) that provide noise isolation, desaturation detection, over voltage or over current protection, and the like.

The switch sets 54 may be formed, as depicted, with the switches 56 and 58 arranged in a reverse conducting die layout, allowing bi-directionally conduction and eliminating the need to incorporate fly-back diodes. This layout of the switch sets 54 facilitates the compact stacked arrangement of the module 50 (FIGS. 3-5), which may be described as a pseudo-double sided construction, and provides for the overall compact design of the module 30.

Figure 3:
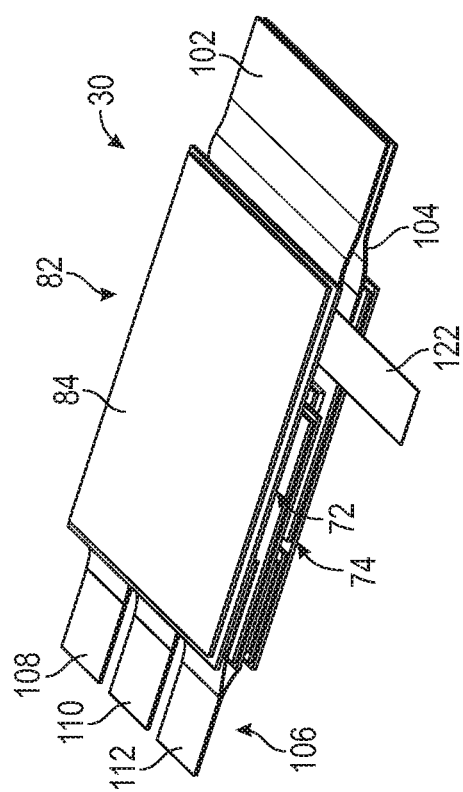
FIG. 3 is a graphic depiction of a compact power module in accordance with herein described exemplary embodiments.
Figure 4:
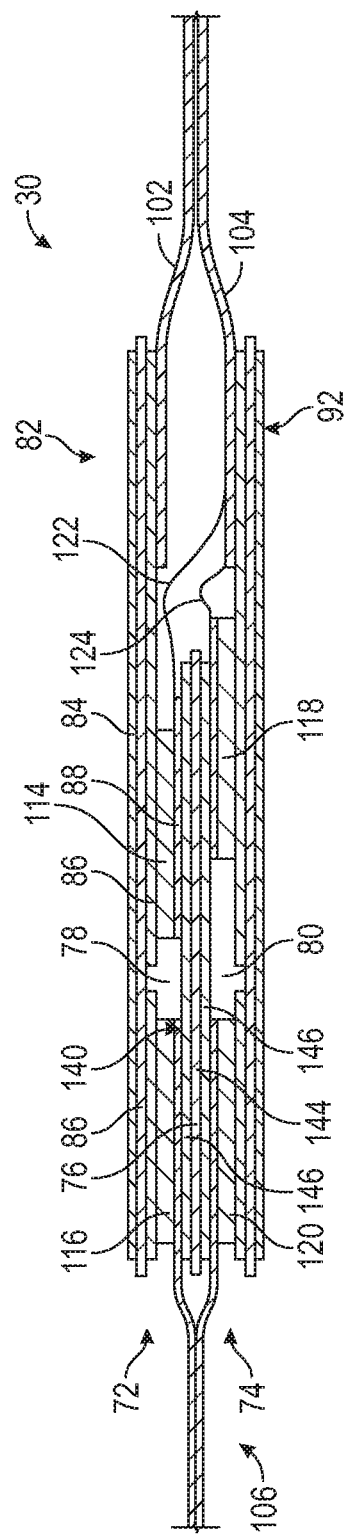
FIG. 4 is a graphic depiction of a cross-section view a compact power module in accordance with herein described exemplary embodiments.
Figure 5:
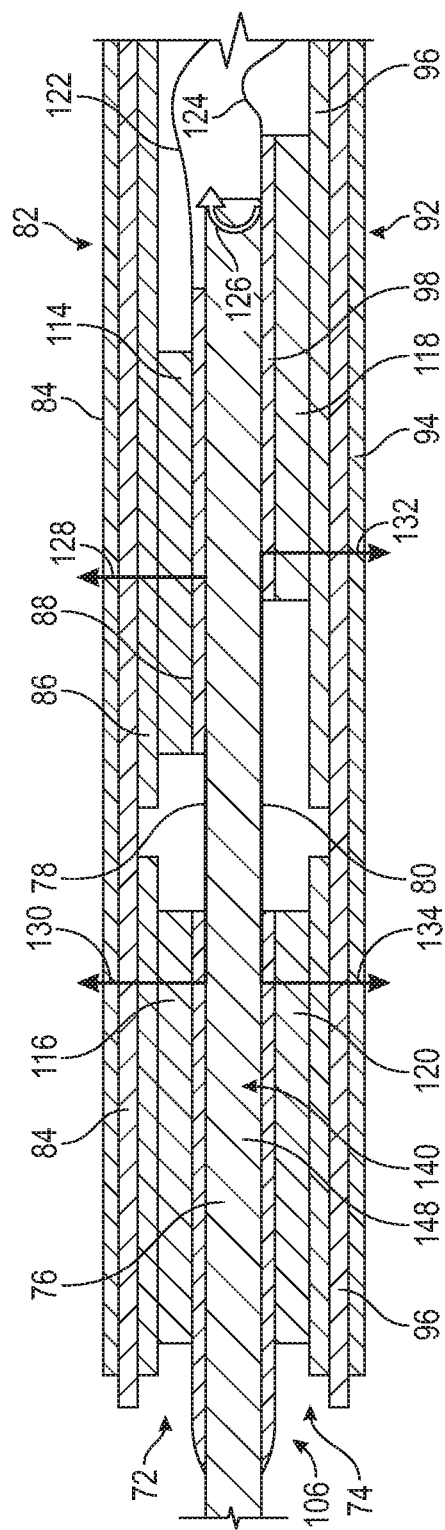
FIG. 5 is a graphic depiction of an enlarged cross-section view a compact power module in accordance with herein described exemplary embodiments.

In accordance with the herein described exemplary embodiments, and with reference to FIGS. 3-5, the power module 50 has a compact, stacked pseudo-double sided structure 70 including a first circuit assembly 72, a second circuit assembly 74 stacked on opposing sides 78 and 80 of an output structure 76.

The first circuit assembly 72 may include a first DC bus 82 having a copper substrate 84 on which are formed one or more insulating or semiconducting layers 86. On the layers 86 there are formed one or more circuit elements 88, such as IGBT, MOSFET or other suitable power switching device. The first DC bus 82 may be made using a suitable manufacturing technology such as active metal brazing (AMB), thick printed copper (TPC), direct bonded copper (DBC) and the like. The copper substrate 84 may be pure copper or copper alloys, or other suitable metals may be substituted for copper such as aluminum and aluminum allows. The insulating layers may be ceramics such as silicon nitrides, aluminum nitrides, aluminum oxides, zirconium oxides, zirconia toughened alumina, and the like. The circuit elements 88 may be formed using any semiconductor material, such as silicon and gallium.

The second circuit assembly 74 may include a second DC bus 92 of similar construction as the first DC bus 82. In this regard, the second DC bus 92 includes a copper substrate 94, on which are formed one or more insulating or semiconducting layers 96, and on which are formed one or more circuit elements 98, such as IGBT, MOSFET or other suitable power switching device. A negative DC conductor 102 is operably coupled to the first DC bus 82 and a positive DC conductor 104 is operably coupled to the second DC bus 92. Disposed between the first circuit assembly 72 and the second circuit assembly 74 is an AC output bus 106 having three-phase AC electric output 108, 110 and 112.

First and second thermal conductors 114/116 are disposed between the first DC bus 82 and the output AC bus 106. Third and fourth thermal conductors 118/120 are disposed between the second DC bus 92 and the output AC bus 106. The conductors 114, 116, 118 and 120 may be metal, such as copper, aluminum, alloys thereof, and the like. Flex circuit couplings 122/124 operably couple to the switching circuit elements 88 and 98. The flex circuit couplings 122/124 may be oriented perpendicular, i.e., at 90 degrees, to the orientation of the first DC bus 82 and the second DC bus 92, thereby reducing cross-coupling and control loop inductance.

The orientation and spacing of the first DC bus 82 relative to the second DC bus 92, and the associated circuit elements 88 and 98, provides at least partial overlapping of the circuit elements 88 and 98 in the stacked configuration 70. This orientation of the circuit elements 88 and 98 reduces power loop inductive coupling within the module 50 by providing a canceling effect. Additionally, a control loop inductive path 126 (FIG. 5) is also minimized thereby reducing control loop inductance.

Referring to FIG. 5, direct thermal coupling between the AC output bus 106 circuit element 88, the conductor 114 and the first DC bus 82 forms a first thermal conduction path 128, while direct thermal coupling of the output AC bus 106, the conductor 116 and the first DC bus 82 forms a second thermal conduction path 130. The thermal conduction paths 128 and 130 facilitate thermal conductive cooling of the circuit element 88. Similarly, direct thermal coupling between the circuit element 98, the conductor 118 and the second DC bus 92 forms a third thermal conduction path 132, while direct thermal coupling of the output AC bus 106, the conductor 120 and the second DC bus 92 forms a fourth thermal conduction path 134. The thermal conduction paths 132 and 134 facilitate thermal conductive cooling of the circuit element 98. In this manner, the conductors 114, 116, 118 and 120 reduce thermally induced power loses in the circuit elements 88 and 98.

The AC bus 106 may be a layered structure 140, in which a conductor 142 is disposed between insulating layers 144 (FIG. 4). Alternatively, the AC bus 106 may be metal conductor 148, such as copper, which enhances thermal performance (FIG. 5).

The module 50 has a compact design, reduces power loop inductance, reduces control loop inductance and provides thermal management of the circuit elements 88 and 98 disposed therein. The module 50 has high circuit density in the stacked structure 70 with circuit elements 88 and 98 being formed on first and second DC bus bars 82 and 92 and at least partially overlapping to reduce induced electrical noise. While shown with circuit elements 88 and 98 formed respectively on first DC bus 82 and second DC bus 92, it will be appreciated that only one of circuit elements 88 and 98 need be provided, or alternatively, that additional circuit elements may be provided in the compact module 50. Additionally, it will be appreciated that the structures and circuit elements of the module 50 may be formed using materials and manufacturing techniques providing controlled thermal expansion (CTE) enhancing the reliability of the module 50.

The foregoing detailed description is merely exemplary in nature and is not intended to limit the application and uses. Furthermore, there is no intention to be bound by any expressed or implied theory presented in the preceding technical field, background, brief summary or the detailed description. It should be understood that throughout the drawings, corresponding reference numerals indicate like or corresponding parts and features. As used herein, the term system or module may refer to any combination or collection of mechanical systems and components and/or other suitable components that provide the described functionality.

Embodiments may be described herein in terms of functional and/or logical block components and various processing steps. It should be appreciated that such block components may be realized by any number, combination or collection of mechanical components configured to perform the specified functions. Those skilled in the art will appreciate that the herein described embodiments may be practiced in conjunction with any number of mechanical components and systems, and that the systems described herein are merely exemplary.

For the sake of brevity, conventional components and techniques and other functional aspects of the components and systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

While at least one exemplary embodiment has been presented in the foregoing detailed description, it should be appreciated that a vast number of variations exist. While the exemplary embodiments have been described in terms of providing a power module, the herein described structures may find application to a broad range of power semiconductor switches including silicon (Si), silicon carbide (SiC), gallium nitride (GaN) and other wide band gap material devices. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof. Accordingly, details of the exemplary embodiments or other limitations described above should not be read into the claims absent a clear intention to the contrary

What is claimed is:

1. An electric vehicle comprising:
    a direct current (DC) power source with a DC electric power output;
    a module that is coupled to receive the DC electric power output of the DC power source, the module having an alternating current (AC) electric power output; and
    an electric motor that is coupled to receive the AC electric power output, the electric motor having a driving torque output that is coupled to drive at least one wheel of the vehicle, wherein
    the module comprises a power module including a first circuit structure and a second circuit structure, the first circuit structure and the second circuit structure are stacked relative to an output structure, and wherein a first circuit element of the first circuit structure at least partially overlaps a second circuit element of the second circuit structure;
    a first thermal conductor disposed between the first circuit structure and the output member to provide direct thermal coupling of the first circuit structure and the output member, a second thermal conductor disposed between the second circuit structure and the output member to provide direct thermal coupling of the second circuit structure and the output member; and wherein
    the first thermal conductor forms at least a first thermally conductive path from the first circuit element and the output member to a first exterior portion of the power module, and the second thermal conductor forms at least a second thermally conductive path from the second circuit element and the output member to a second exterior portion of the power module.

2. The electric vehicle of claim 1, wherein each of the first circuit element and the second circuit element comprises one of an insulated-gate bipolar transistor (IGBT), a metal oxide field effect transistor (MOSFET) and a gate turn off thyristor (GTO).

3. The electric vehicle of claim 1, wherein the first circuit structure comprises a first DC bus member and the second circuit structure comprises a second DC bus member.

4. The electric vehicle of claim 3, wherein each of the first DC bus member and the second DC bus member comprises a copper substrate.

5. The electric vehicle of claim 3, wherein the first circuit element is formed on the first DC bus member and the second circuit element is formed on the second circuit member.

6. The electric vehicle of claim 1, wherein the output structure comprises an alternative current (AC) bus disposed between the first circuit structure and the second circuit structure, the first circuit element and the second circuit element each being operably coupled to the AC bus.

7. The electric vehicle of claim 6, wherein the AC bus is three phase.

8. A power module comprising:
a first circuit structure; and
a second circuit structure;
wherein the first circuit structure and the second circuit structure are stacked relative to an output structure,
wherein a first circuit element of the first circuit structure at least partially overlaps a second circuit element of the second circuit structure;
a first thermal conductor disposed between the first circuit structure and the output structure to provide direct thermal coupling of the first circuit structure and the output structure, and a second thermal conductor disposed between the second circuit structure and the output structure to provide direct thermal coupling of the second circuit structure and the output structure; and wherein
the first thermal conductor forms at least a first conductive path from the first circuit element and the output member to a first exterior portion of the power module, and the second thermal conductor forms at least a second conductive path from the second circuit element and the output member to a second exterior portion of the power module.

9. The power module of claim 8, wherein each of the first circuit element and the second circuit element comprises one of an insulated-gate bipolar transistor (IGBT), a metal oxide field effect transistor (MOSFET) and a gate turn off thyristor (GTO).

10. The power module of claim 8, wherein the first circuit structure comprises a first DC bus member and the second circuit structure comprises a second DC bus member.

11. The power module of claim 10, wherein each of the first DC bus member and the second DC bus member comprises a copper substrate.

12. The power module of claim 10, wherein the first circuit element is formed on the first DC bus member and the second circuit element is formed on the second circuit member.

13. The power module of claim 8, the output structure comprises an alternative current (AC) bus disposed between the first circuit structure and the second circuit structure, the first circuit element and the second circuit element each being operably coupled to the AC output structure.

14. The power module of claim 13, wherein the AC bus is three phase.

15. A power module comprising:
a first circuit structure having a first bus substrate, the first bus structure having a first side on which is disposed a first circuit element;
a second circuit structure having a second bus substrate, the second bus structure having a second side on which is disposed a second circuit element; and wherein,
the first circuit structure and the second circuit structure being oriented in a stacked configuration, the first side is disposed facing the second side, and the first circuit element partially overlaps the second circuit element, and an output bus being disposed between the first circuit structure and the second circuit structure;
a first thermal conductor disposed between the first circuit structure and the output structure to provide direct thermal coupling of the first circuit element and the output structure, and a second thermal conductor disposed between the second circuit element and the output structure to provide direct thermal coupling of the second circuit element and the output structure; and wherein
the first thermal conductor forms at least a first conductive path from the first circuit element and the output member to a first exterior portion of the power module, and the second thermal conductor forms at least a second conductive path from the second circuit element and the output member to a second exterior portion of the power module.

16. The power module of claim 15, wherein each of the first circuit element and the second circuit element comprises one of an insulated-gate bipolar transistor (IGBT), a metal oxide field effect transistor (MOSFET) and a gate turn off thyristor (GTO).

17. The power module of claim 15, the output bus comprising an alternative current (AC) output bus.

* * * * *